(12) United States Patent
Hori et al.

(10) Patent No.: US 6,810,772 B2
(45) Date of Patent: Nov. 2, 2004

(54) AUTOMATIC TRANSMISSION

(75) Inventors: Yoshiaki Hori, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/401,756

(22) Filed: Mar. 31, 2003

(65) Prior Publication Data

US 2003/0213336 A1 Nov. 20, 2003

(30) Foreign Application Priority Data

May 7, 2002 (JP) ........................................ 2002-131938

(51) Int. Cl.$^7$ .............................................. F16H 47/00
(52) U.S. Cl. ..................... 74/731.1; 74/732.1
(58) Field of Search .............................. 74/731.1, 732.1

(56) References Cited

U.S. PATENT DOCUMENTS

| | | | | | |
|---|---|---|---|---|---|
| 2,337,748 A | * | 12/1943 | Wilhelm | ..................... | 477/66 |
| 2,707,408 A | * | 5/1955 | Ahlen | ......................... | 477/57 |
| 2,959,984 A | * | 11/1960 | Wickman | .................... | 475/38 |
| 3,416,393 A | * | 12/1968 | Torao | ........................... | 475/61 |
| 3,752,012 A | * | 8/1973 | Ross et al. | .................... | 475/60 |

* cited by examiner

*Primary Examiner*—Dirk Wright
(74) *Attorney, Agent, or Firm*—Birch, Stewart, Kolasch & Birch, LLP

(57) ABSTRACT

An automatic transmission in a power unit with a torque converter and a hydraulic clutch to be engaged and disengaged for the switching of speed-change gears. Hydraulic pressure is applied to the clutch and is increased only when operating the clutch during acceleration of a vehicle. A pressure control valve is provided at a discharge port of an oil pump for supplying hydraulic oil to the hydraulic clutch. The pressure control valve includes a valve body, a valve element is axially slidably provided in the valve body, and a spring is provided between the valve element and the valve body in a sliding direction of the valve element for adjusting a set pressure for opening/closing of the pressure control valve. The valve element is urged in its closing direction by a repulsive force applied to a stator in the torque converter.

16 Claims, 14 Drawing Sheets

AUTOMATIC TRANSMISSION

CROSS-REFERENCE TO RELATED APPLICATIONS

The present nonprovisional application claims priority under 35 USC 119 to Japanese Patent Application No. 2002-131938 filed on May 7, 2002 the entire contents thereof is hereby incorporated by reference.

BACKGROUND OF THE INVENTION

1. Field of the Invention

The present invention relates to an automatic transmission in a power unit mounted on a four-wheel buggy (saddle type vehicle for rough terrain running) or the like, wherein the power unit is configured by integrating an internal combustion engine with a torque converter and a transmission having a hydraulic clutch.

2. Description of Background Art

In a transmission having a hydraulic clutch adapted to be engaged and disengaged for the switching of speed-change gears, a friction loss is reduced by increasing a contact pressure hydraulically applied to a clutch plate. Although the contact pressure can be increased by increasing a clutch capacity, the clutch is undesirably increased in size. Increasing the contact pressure is required at the time the vehicle is accelerated to operate the clutch. A conventional power unit has no means for increasing an hydraulic pressure supplied by an oil pump in operating the clutch.

SUMMARY AND OBJECTS OF THE INVENTION

It is accordingly an object of the present invention to provide an automatic transmission having a function of increasing a hydraulic pressure applied to a clutch only when accelerating a vehicle to operate the clutch.

According to the present invention, an automatic transmission in a power unit with a torque converter and a hydraulic clutch is provided that are adapted to be engaged and disengaged for the switching of speed-change gears. The automatic transmission includes a pressure control valve provided at a discharge port of an oil pump for supplying a hydraulic oil to said hydraulic clutch. The pressure control valve includes a valve body, a valve element axially slidably provided in said valve body, and a spring provided between said valve element and said valve body in a sliding direction of said valve element for adjusting a set pressure for opening/closing of the pressure control valve. The valve element is urged in its closing direction by a repulsive force applied to a stator in the torque converter.

With this configuration, at acceleration of a vehicle having the automatic transmission according to the present invention, a large hydraulic pressure is supplied to the hydraulic clutch, so that a power transmitting rate can be increased without the need for increasing the size of the clutch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
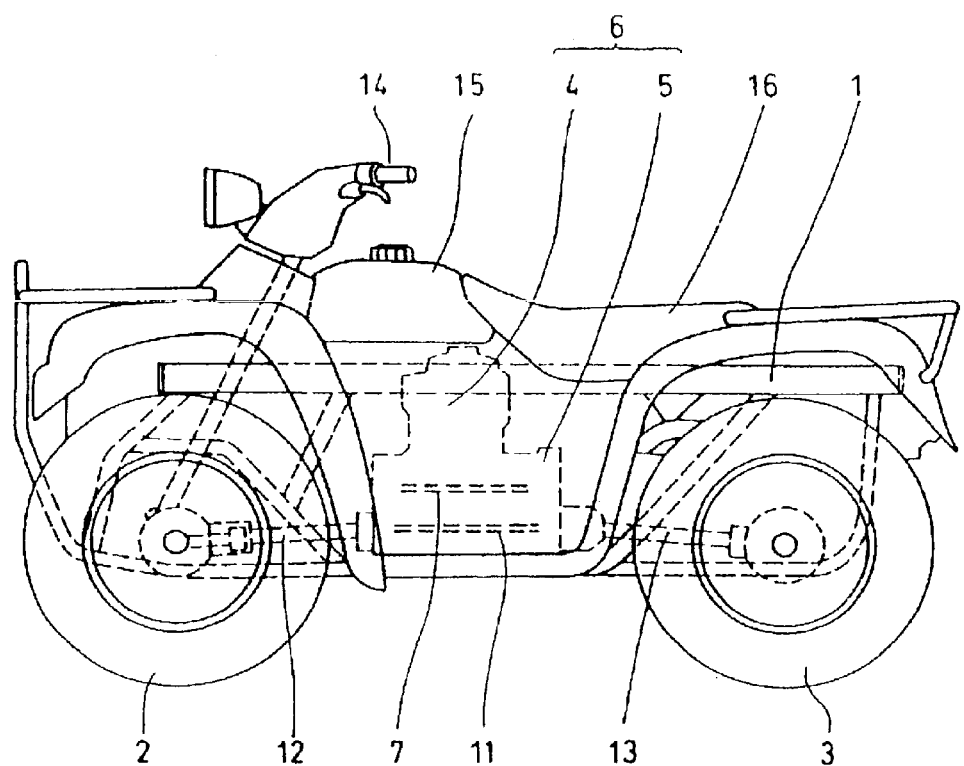
FIG. 1 is a side view of a four-wheel buggy (saddle type vehicle for rough terrain running) having a power unit with an automatic transmission according to a preferred embodiment of the present invention.

FIG. 1 is a side view of a four-wheel buggy (saddle type vehicle for rough terrain running) having a power unit with an automatic transmission according to a preferred embodiment of the present invention. This buggy includes a body frame 1, a pair of right and left front wheels 2 provided at a front portion of the body frame 1, and a pair of right and left rear wheels 3 provided at a rear portion of the body frame 1. A power unit 6 configured by integrating an internal combustion engine 4 and a transmission 5 is supported to a central portion of the body frame 1. The power unit 6 is arranged so that a crankshaft 7 extends in the longitudinal direction of the vehicle. As will be hereinafter described in detail, the rotation of the crankshaft 7 is transmitted through a main shaft 8, an intermediate shaft 9, and a counter shaft 10 to an output shaft 11 in the transmission 5. These shafts 8, 9, 10, and 11 extend parallel to the crankshaft 7 in the longitudinal direction of the vehicle. The front wheels 2 are driven by a front drive shaft 12 connected to the front end of the output shaft 11, and the rear wheels 3 are driven by a rear drive shaft 13 connected to the rear end of the output shaft 11. A steering handle 14, a fuel tank 15, and a saddle seat 16 are arranged in this order from the front side of the vehicle on an upper portion of the body frame 1.

Figure 2:
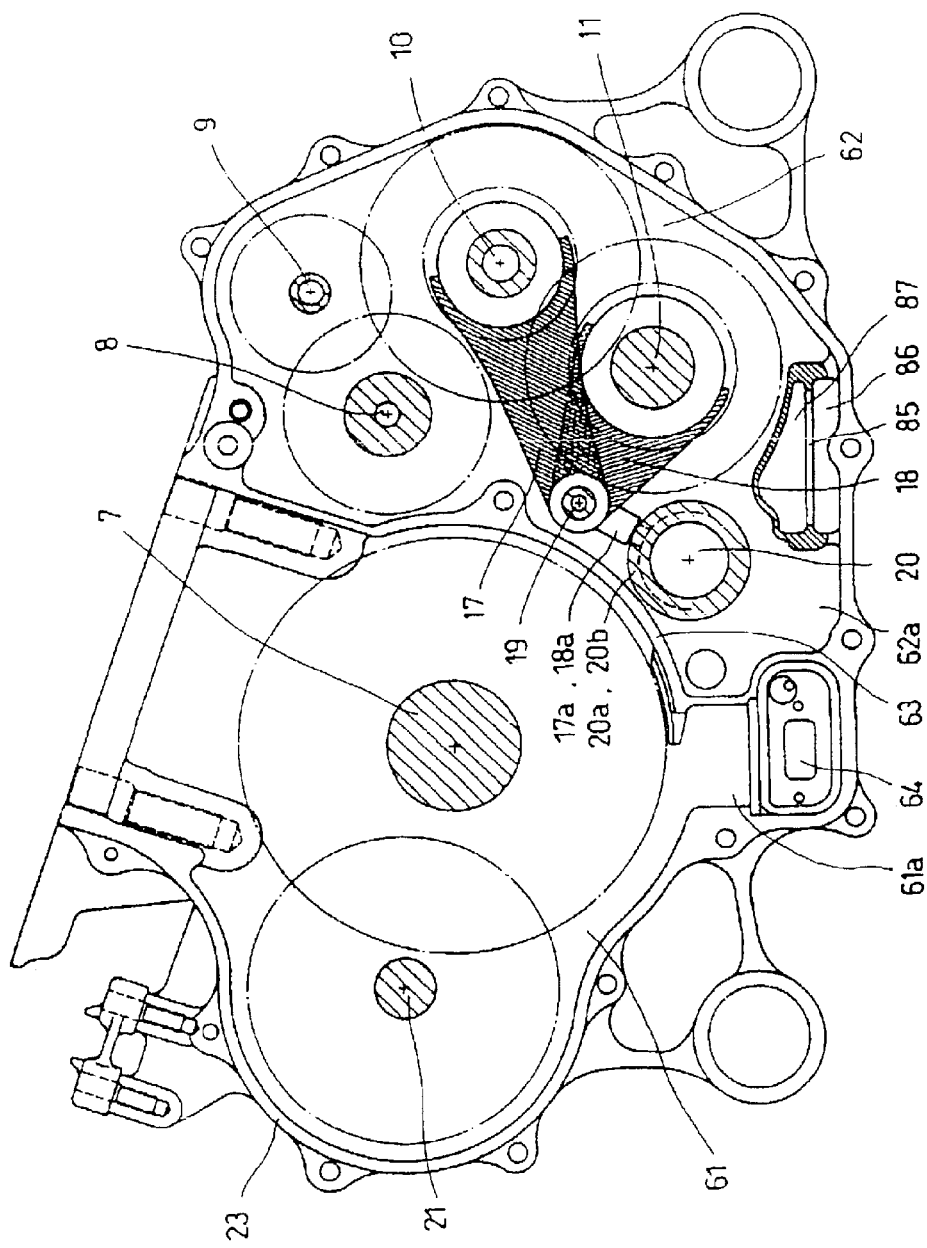
FIG. 2 is a front elevation in cross section of the crankcase 23 of the power unit.
Figure 3:
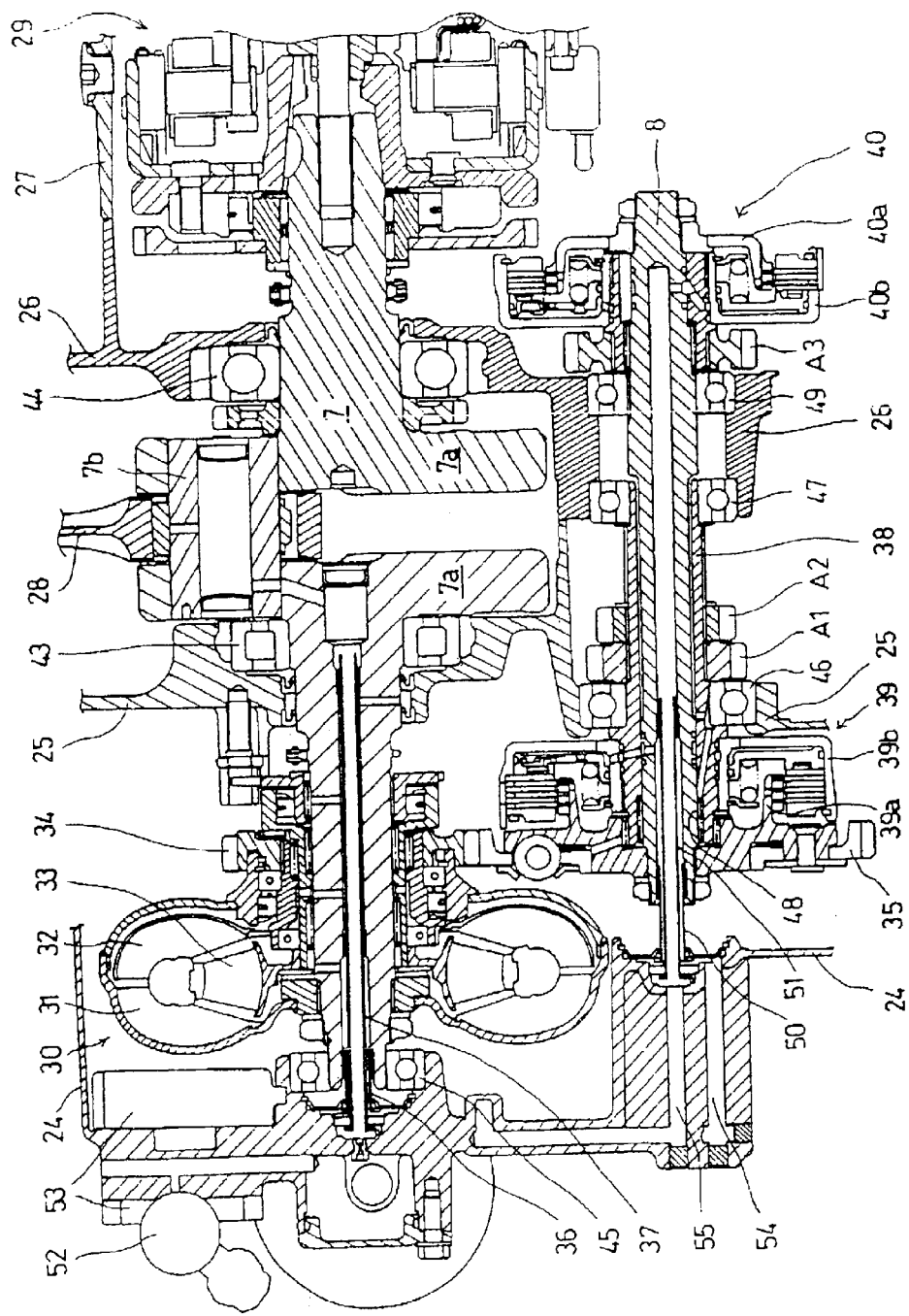
FIG. 3 is a longitudinal sectional view including the crankshaft 7 and the main shaft 8.
Figure 4:
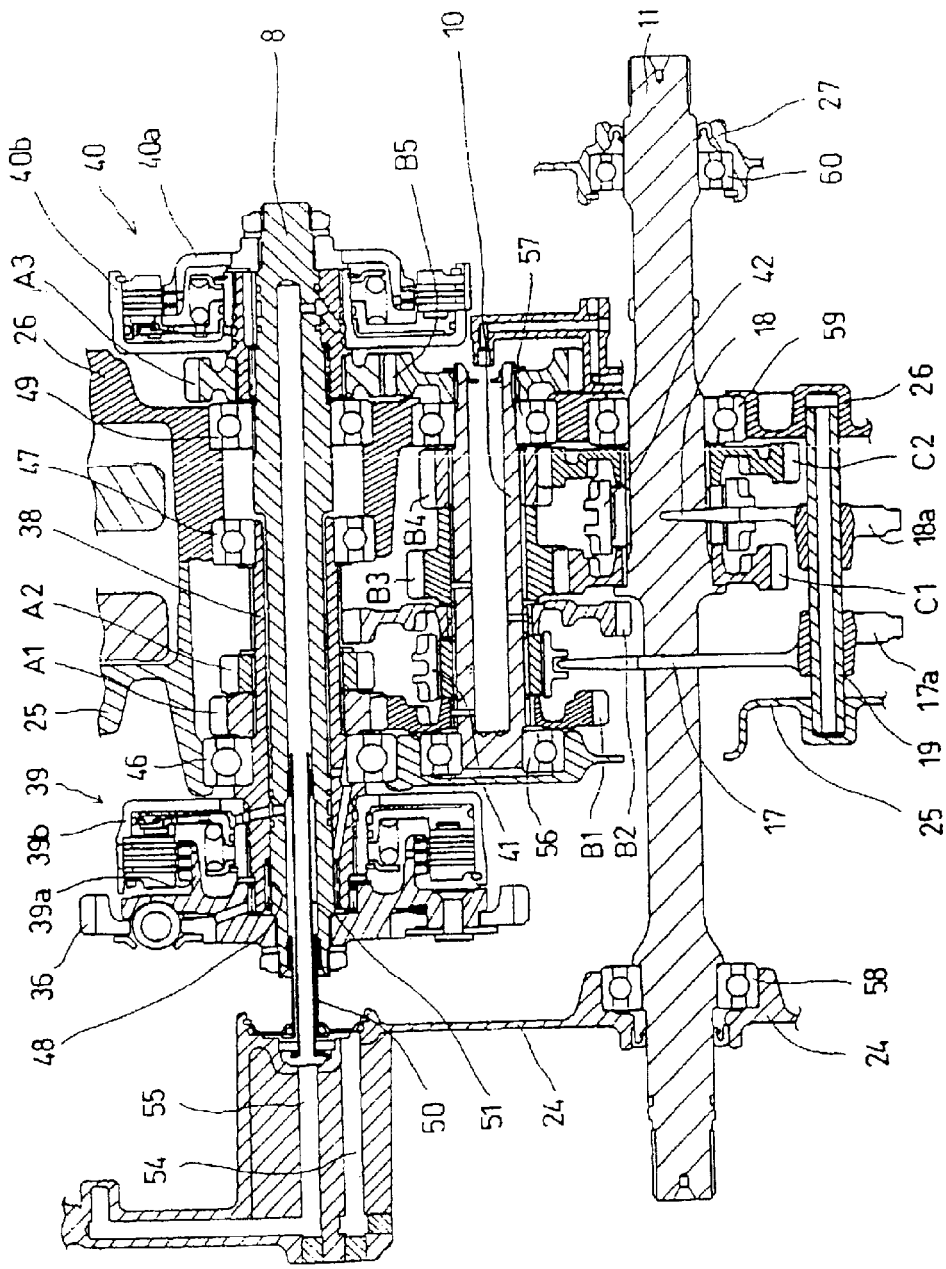
FIG. 4 is a longitudinal sectional view in development including the main shaft 8, the counter shaft 10, the output shaft 11 and the shift fork guide shaft 19.
Figure 5:
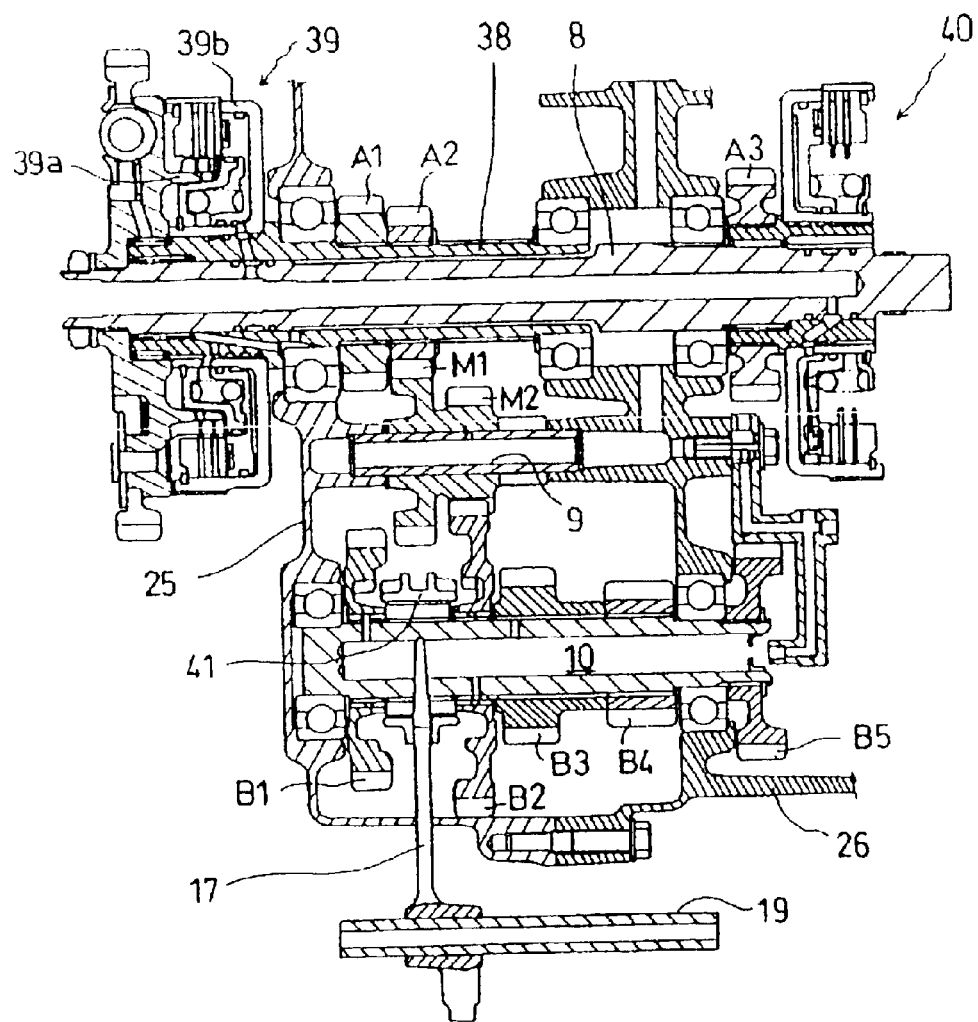
FIG. 5 is a longitudinal sectional view in development including the main shaft 8, the intermediate shaft 9, the counter shaft 10, and the shift fork guide shaft 19.

FIG. 2 is a front elevation in cross section of a crankcase 23 of the power unit 6, showing the crankshaft 7, the main shaft 8, the intermediate shaft 9, the counter shaft 10, and the output shaft 11. FIG. 2 further shows the positions of shift forks 17 and 18, a shift fork guide shaft 19, and a shift drum 20. A balance weight shaft 21 is provided in the vicinity of the crankshaft 7. FIG. 3 is a longitudinal sectional view including the crankshaft 7 and the main shaft 8. FIG. 4 is a longitudinal sectional view in development including the main shaft 8, the counter shaft 10, the output shaft 11, and the shift fork guide shaft 19. FIG. 5 is a longitudinal sectional view in development including the main shaft 8, the intermediate shaft 9, the counter shaft 10, and the shift fork guide shaft 19. These sectional views show a power transmitting mechanism, and in particular FIGS. 4 and 5 show a portion related to the automatic transmission.

FIG. 3 shows a power transmitting mechanism related to the crankshaft 7 and the main shaft 8. The crankcase 23 of the power unit 6 is composed of a front crankcase cover 24, a front crankcase 25, a rear crankcase 26, and a rear crankcase cover 27 arranged in this order from the front side of the power unit 6. The crankshaft 7 is rotatably supported through bearings 43 and 44, respectively, to the front and rear crankcases 25 and 26. An extended front end of the crankshaft 7 is supported through a bearing 45 to the front crankcase cover 24. The crankshaft 7 is divided into front and rear sections in the longitudinal direction. The front and rear sections of the crankshaft 7 are connected at their crank webs 7a by a crankpin 7b. A connecting rod 28 is supported by the crankpin 7b. An alternator 29 for producing alternating current by the rotation of the crankshaft 7 is mounted on a rear end portion of the crankshaft 7 (the rear section).

A torque converter 30 is mounted on a front portion of the crankshaft 7 (the front section). A primary drive gear 34 adjacent to the torque converter 30 is loosely engaged with the crankshaft 7. The torque converter 30 includes a pump impeller 31 fixed to the crankshaft 7. A turbine runner 32 is opposed to the pump impeller 31 and a stator 33. The turbine runner 32 is connected to the primary drive gear 34. Hydraulic oil to the torque converter 30 is supplied from between an outer pipe 36 and an inner pipe 37 constituting a double pipe inserted in a center hole of the crankshaft 7 from the front crankcase cover 24. A lubricating oil to the crankpin 7b is supplied through the inner pipe 37. The double pipe is elastically supported through an O-ring to the front crankcase cover 24, thereby absorbing eccentricity of the double pipe.

A tubular auxiliary main shaft 38 is provided on the outer circumference of the main shaft 8 at its front half portion. The auxiliary main shaft 38 is rotatably supported through bearings 46 and 47 respectively to the front and rear crankcases 25 and 26. The front half portion of the main shaft 8 is inserted through a center hole of the auxiliary main shaft 38 and is rotatably supported through a needle bearing 48 to the auxiliary main shaft 38. The main shaft 8 is further rotatably supported at its rear portion through a bearing 49 to the rear crankcase 26. Thus, the main shaft 8 and the auxiliary main shaft 38 are rotatable relatively to each other.

A primary driven gear 35 normally meshing with the primary drive gear 34 is fixed to a front end portion of the main shaft 8. The rotation of the crankshaft 7 is transmitted through the torque converter 30 to the primary drive gear 34 and next to the primary driven gear 35 meshing with the primary drive gear 34, thereby being transmitted to the main shaft 8 with a primary speed reduction obtained by the gears 34 and 35. The main shaft 8 is normally rotated during operation of the internal combustion engine 4.

A first-speed hydraulic multiple disc clutch 39 is provided at a front end portion of the auxiliary main shaft 38 on the front side of the bearing 46. A first-speed drive gear A1 and a reverse drive gear A2 are fixed to the auxiliary main shaft 38 on the rear side of the bearing 46. The first-speed hydraulic multiple disc clutch 39 has an inner member 39a integral with the primary driven gear 35 fixed to the main shaft 8 and an outer member 39b fixed to the auxiliary main shaft 38. When the first-speed hydraulic multiple disc clutch 39 is engaged by hydraulic pressure, the main shaft 8 and the auxiliary main shaft 38 are connected together through the primary driven gear 35 and the clutch 39, thereby transmitting the rotation of the main shaft 8 to the first-speed drive gear A1 and the reverse drive gear A2.

A second-speed drive gear A3, larger in diameter than the first-speed drive gear A1, is loosely engaged with a rear end portion of the main shaft 8 on the rear side of the bearing 49. A second-speed hydraulic multiple disc clutch 40 is provided axially adjacent to the second-speed drive gear A3. The second-speed hydraulic multiple disc clutch 40 has an inner member 40a fixed to the main shaft 8 and an outer member 40b connected to the second-speed drive gear A3 so as to be rotatable therewith. When the second-speed hydraulic multiple disc clutch 40 is engaged by hydraulic pressure, the rotation of the main shaft 8 is transmitted to the second-speed drive gear A3.

In engaging the first-speed clutch 39 or the second-speed clutch 40, hydraulic oil is supplied to either the clutch 39 or the clutch 40. The hydraulic oil to the clutch 39 is supplied from between an outer pipe 50 and an inner pipe 51 constituting a double pipe inserted from the front crankcase cover 24 into the center hole of the main shaft 8. On the other hand, the hydraulic oil to the clutch 40 is supplied through the inner pipe 51 of the double pipe. The supply of hydraulic oil to the clutch 39 or 40 is switched by controlling the energization of a solenoid valve 52 to switch between oil passages formed in a valve body 53 and thereby to switch between oil passages 54 and 55 formed in the front crankcase cover 24 and communicating with the above double pipe. The energization of the solenoid valve 52 is automatically performed by a command signal from an electronic control unit according to parameters such as a vehicle speed and a throttle opening. The above double pipe is elastically supported through an O-ring to the front crankcase cover 24, thereby absorbing eccentricity of the double pipe.

FIG. 4 shows a power transmitting mechanism for power transmission from the main shaft 8 through the counter shaft 10 to the output shaft 11. The counter shaft 10 is rotatably supported through bearings 56 and 57, respectively, to the front and rear crankcases 25 and 26. The output shaft 11 is rotatably supported through bearings 58, 59, and 60, respectively, to the front crankcase cover 24, the rear crankcase 26, and the rear crankcase cover 27.

A first-speed driven gear B1 and a reverse driven gear B2 are loosely engaged with the counter shaft 10. A dog clutch 41 for selecting a forward position or a reverse position is provided between the first-speed driven gear B1 and the reverse driven gear B2. By moving the shift fork 17 to operate the dog clutch 41, either the gear B1 or B2 can be selectively fixed to the counter shaft 10. Further, a high drive gear B3, a low drive gear B4, and a second-speed driven gear B5 are fixed to the counter shaft 10. The high drive gear B3 is larger in diameter than the low drive gear B4.

A high driven gear C1 and a low driven gear C2 are loosely engaged with the output shaft 11. A dog clutch 42 for selecting a high position or a low position is provided between the high driven gear C1 and the low driven gear C2. By moving the shift fork 18 to operate the dog clutch 42, either the gear C1 or C2 can be selectively fixed to the output shaft 11. The shift forks 17 and 18 are supported by the guide shaft 19. The shift forks 17 and 18 are provided with shifter pins 17a and 18a, respectively. The outer ends of the shifter pins 17a and 18a are inserted in cam grooves 20a and 20b formed on the shift drum 20 shown in FIG. 2, respectively. The cam grooves 20a and 20b are formed as grooves dedicated to the shifter pins 17a and 18a, respectively. By rotating the shift drum 20, the shift forks 17 and 18 are moved through the shifter pins 17a and 18a and the cam grooves 20a and 20b. The rotation of the shift drum 20 is manually made by an operator through an operation cable (not shown) connected to a shift lever (not shown) provided on the steering handle 14.

The first-speed driven gear B1 loosely engaged with the counter shaft 10 is normally in mesh with the first-speed drive gear A1 fixed to the auxiliary main shaft 38. The reverse driven gear B2, loosely engaged with the counter shaft 10, is normally in mesh with the reverse drive gear A2 fixed to the auxiliary main shaft 38 through direction changing gears M1 and M2 to be hereinafter described. The high drive gear B3 and the low drive gear B4 are each fixed to the counter shaft 10 and are normally in mesh with the high driven gear C1 and the low driven gear C2 each loosely engaged with the output shaft 11, respectively. The second-speed driven gear B5 fixed to the counter shaft 10 is normally in mesh with the second-speed drive gear A3 loosely engaged with the main shaft 8.

FIG. 5 shows a power transmitting mechanism for power transmission from the main shaft 8 through the intermediate shaft 9 to the counter shaft 10. The intermediate shaft 9 is supported to the front and rear crankcases 25 and 26. The direction changing gears M1 and M2 are rotatably supported to the intermediate shaft 9. The direction changing gears M1 and M2 are idle gears having a common boss portion. The gear M2 is smaller in diameter than the gear M1. The gear M1 is normally in mesh with the reverse drive gear A2 fixed to the auxiliary main shaft 38, and the gear M2 is normally in mesh with the reverse driven gear B2 loosely engaged with the counter shaft 10.

In the following description of the operation of the above-mentioned power transmitting mechanism, the related terms will be simplified for the convenience of illustration as follows:

Selection of the first-speed hydraulic multiple disc clutch 39: "first speed"

Selection of the second-speed hydraulic multiple disc clutch 40: "second speed"

Selection of the first-speed driven gear B1 by the forward/reverse selecting dog clutch 41: "forward"

Selection of the reverse driven gear B2 by the forward/reverse selecting dog clutch 41: "reverse"

Selection of the high driven gear C1 by the high/low selecting dog clutch 42: "high gear"

Selection of the low driven gear C2 by the high/low selecting dog clutch 42: "low gear"

The number of selective combinations of the hydraulic clutches 39 and 40 and the dog clutches 41 and 42 is six, and these selective combinations are specifically shown below in increasing order of vehicle speed. In each selective combination, a working gear train is also shown.

In the case of forward running:
first speed, forward, low gear: A1-B1-B4-C2
first speed, forward, high gear: A1-B1-B3-C1
second speed, low gear: A3-B5-B4-C2
second speed, high gear: A3-B5-B3-C1

In the case of reverse running:
first speed, reverse, low gear: A2-M1-M2-B2-B4-C2
first speed, reverse, high gear: A2-M1-M2-B2-B3-C1

Referring to FIG. 2, a crank chamber 61 and a transmission chamber 62 are separated from each other by a partition wall 63. The crank chamber 61 is closed by the partition wall 63 and communicates with the transmission chamber 62 at a lower portion of the partition wall 63. This communicating portion between the crank chamber 61 and the transmission chamber 62 is provided with a one-way valve 64. When a piston in the engine 4 is lowered to increase the pressure in the crank chamber 61, the oil in the crank chamber 61 is urged by this increased pressure to flow out through the one-way valve 64 to the transmission chamber 62.

Figure 6:
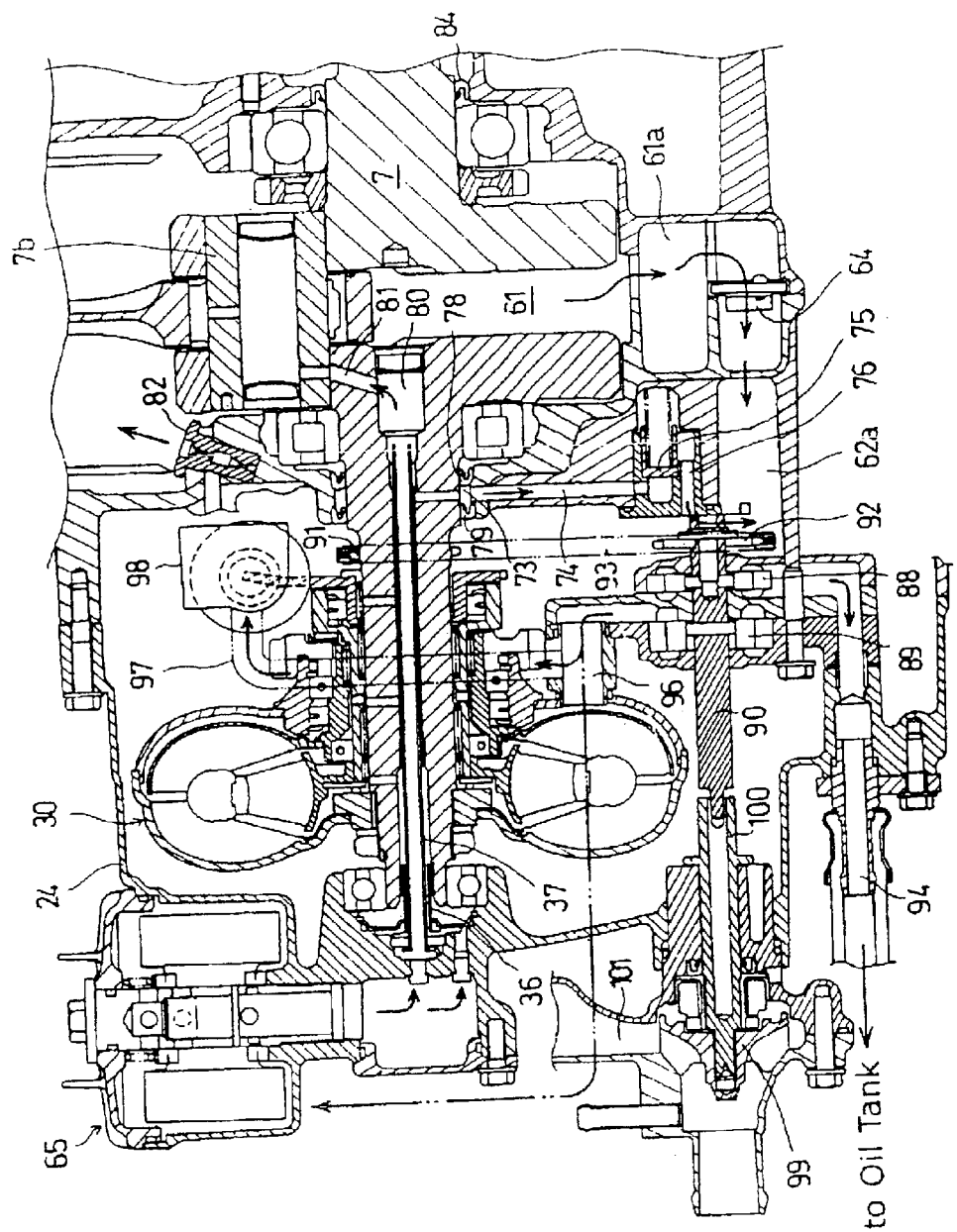
FIG. 6 is a longitudinal sectional view of the power unit, including the crankshaft 7 and the one-way valve 64.
Figure 7:
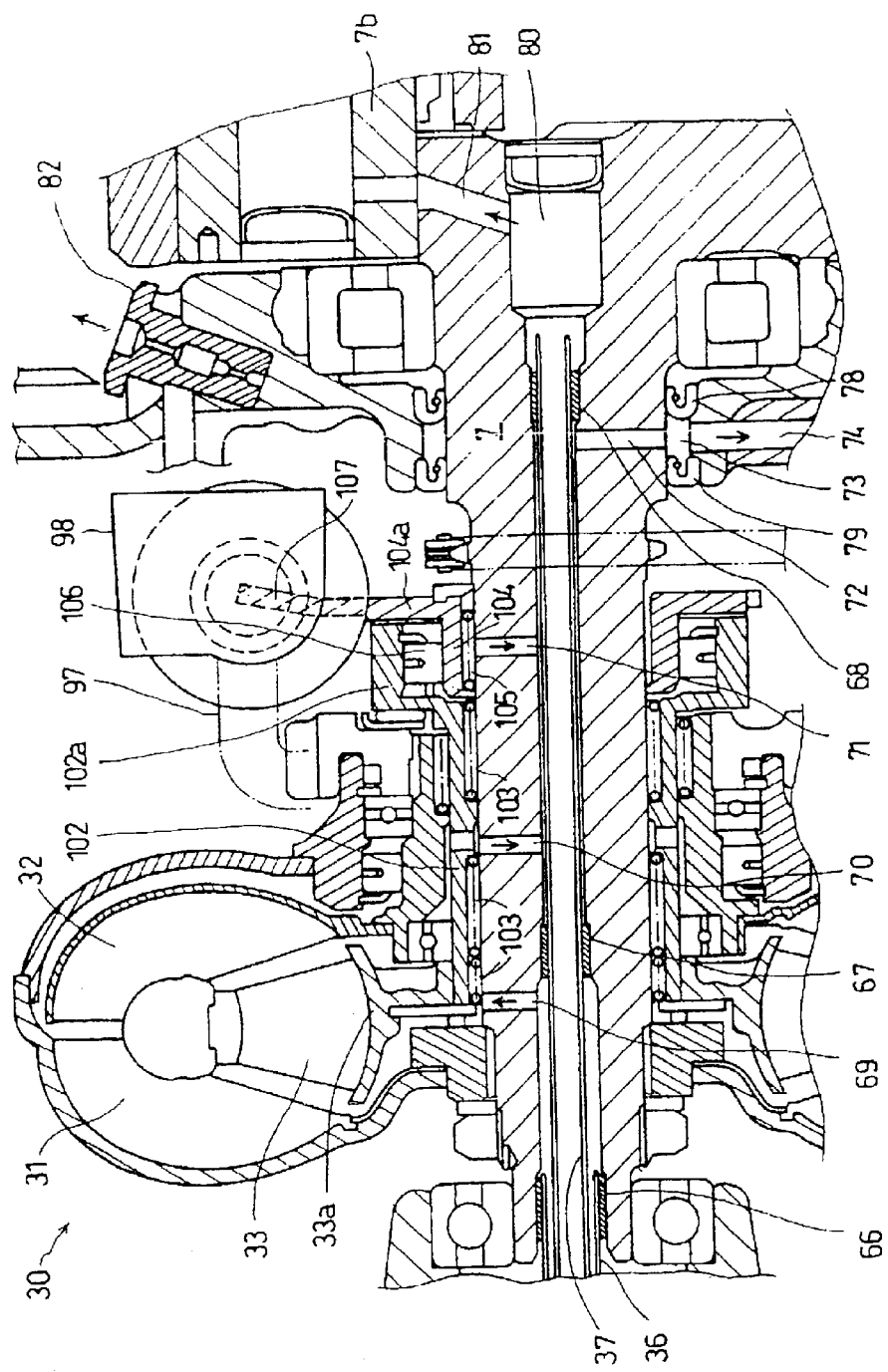
FIG. 7 is an enlarged view of a part shown in FIG. 6.

FIG. 6 is a longitudinal sectional view of the power unit, including the crankshaft 7 and the one-way valve 64, and FIG. 7 is an enlarged view of a part shown in FIG. 6, showing a front half portion of the crankshaft 7 and its periphery. In FIGS. 6 and 7, the arrows indicate a direction of oil flow. An oil filter 65 is mounted on the front side of the front crankcase cover 24. The hydraulic oil flowing through the oil filter 65 and the front crankcase cover 24 to the torque converter 30 provided at the front portion of the crankshaft 7 is supplied from between the outer pipe 36 and the inner pipe 37 constituting the double pipe inserted in the center hole 80 of the crankshaft 7 from the front crankcase cover 24. As shown in FIG. 7, the hydraulic oil is further supplied from a space defined by the inner pipe 37, the crankshaft 7, and seals 66 and 67 through a radial oil passage 69 formed in the crankshaft 7 to the torque converter 30.

Figure 9:
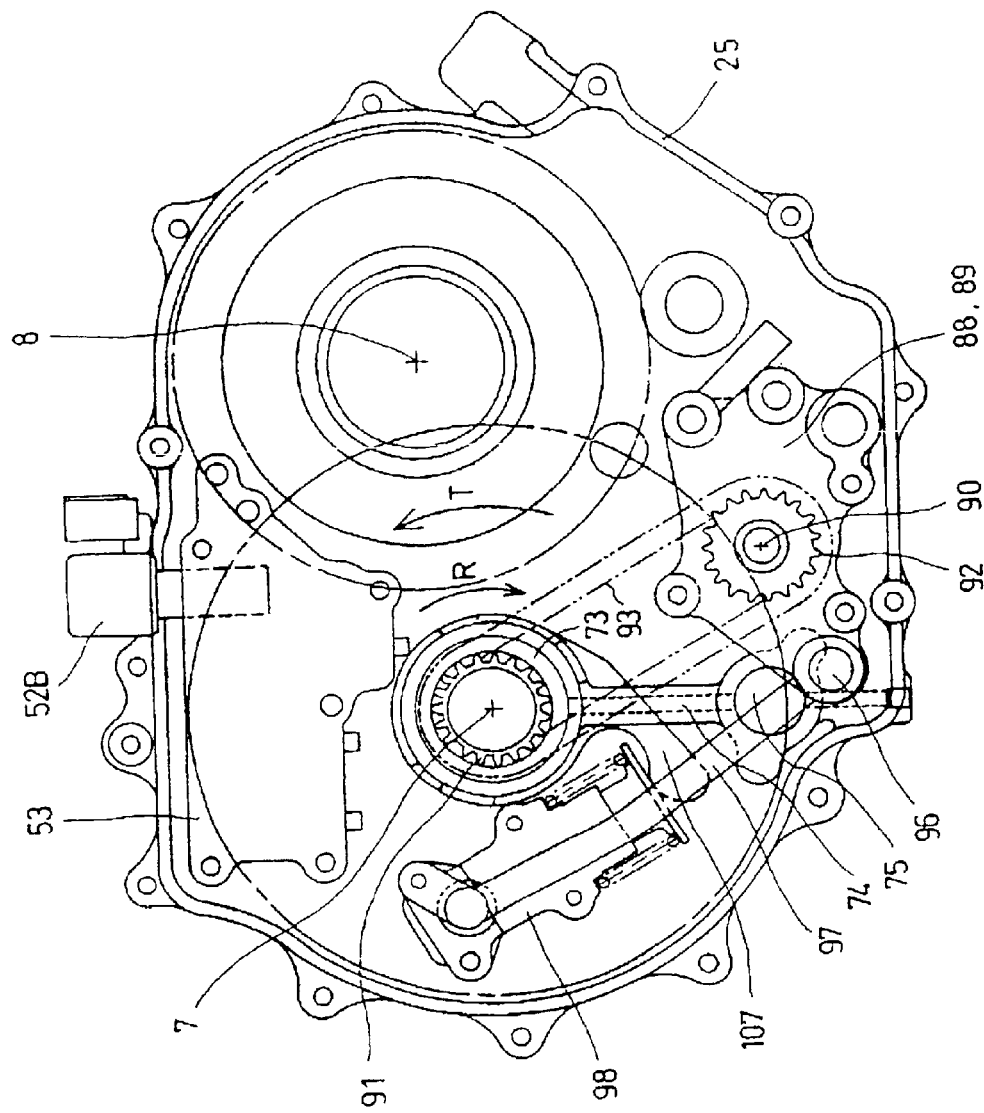
FIG. 9 is a front elevation of the oil pump and its associated parts provided between the front crankcase cover and the front crankcase.

The oil discharged from the torque converter 30 lubricates a bearing portion, and thereafter flows through radial oil passages 70 and 71 formed in the crankshaft 7 to a space defined by the inner pipe 37, the crankshaft 7, and seals 67 and 68. The oil further flows through a radial oil passage 72 formed in the crankshaft 7, an annular small chamber 73 defined between the crankshaft 7 and the front crankcase 25, and an oil passage 74 formed in the front crankcase 25 to a check valve 75 shown in FIG. 6. The oil further flows through the check valve 75 and a discharge oil passage 76 to a lower space 62a of the transmission chamber 62. The annular small chamber 73 defined between the crankshaft 7 and the front crankcase 25 is closed at its axially opposite ends by an oil seal 78 for sealing the bearing 43 and an oil seal 79 on the front side of the oil seal 78, thereby preventing oil leakage from the axially opposite ends of the annular small space 73. The positions of the annular small space 73, the oil passage 74, and the check valve 75 as viewed from the front side of the power unit 6 are shown in FIG. 9 to be referred later.

The pressure of the hydraulic oil in the torque converter 30 must be maintained at a given value or more in order to properly operate the torque converter 30. The reason for providing the check valve 75 at the end of the above-mentioned hydraulic oil discharge path is to maintain the pressure upstream of the check valve 75, i.e., the pressure of the hydraulic oil in the torque converter 30 at a given value or more. The check valve 75 serves also to prevent the oil from being discharged from the torque converter 30 when the internal combustion engine 4 is left for a long time period.

The lubricating oil to the crankpin 7b is supplied through the inner pipe 37 inserted in the center hole 80 of the crankshaft 7 from the front crankcase cover 24, an oil passage is formed at a rear end portion of the center hole 80, and a radial oblique oil passage 81 is formed in the crankshaft 7. Lubrication of the inside of the cylinder and a lower portion of the piston is made by an oil jet sprayed from an oil spraying device 82 (an oil passage to the oil spraying device 82 is not shown).

After the oil supplied through the radial oblique oil passage 81 and through the oil spraying device 82 lubricates the required portions, the oil drops into a lower space 61a of the crank chamber 61 shown in FIGS. 2 and 6. As mentioned above, the crank chamber 61 is a closed chamber, and the gaps between the crankcase 23 and the crankshaft 7 near the bearings 43 and 44 are sealed by the front oil seal 78 and a rear oil seal 84. Accordingly, when the piston is lowered to increase the pressure in the crank chamber 61, the oil in the lower space 61a of the crank chamber 61 is expelled through the one-way valve 64 into the lower space 62a of the transmission chamber 62 to join with the oil passed through the check valve 75.

Figure 8:
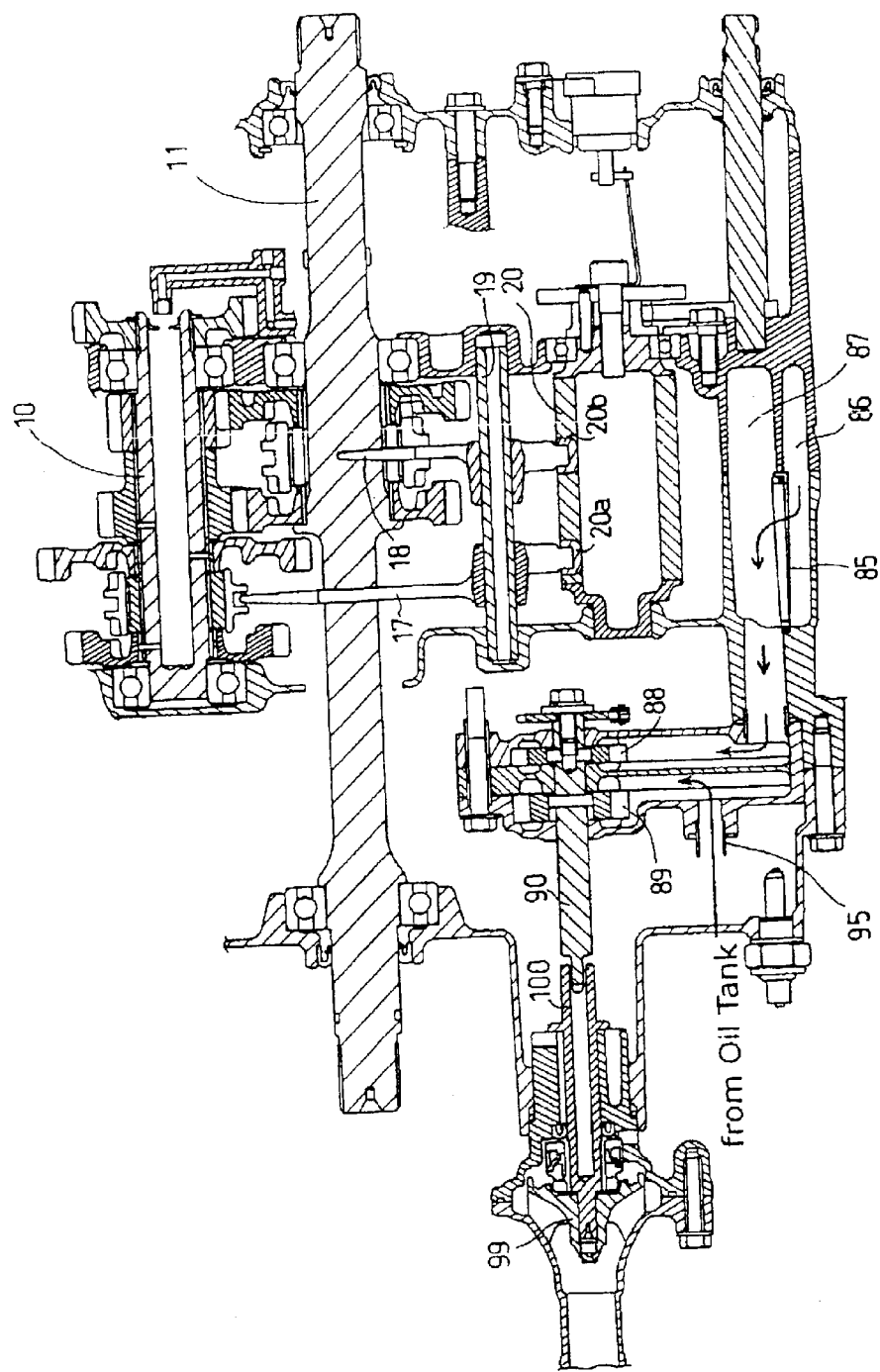
FIG. 8 is a longitudinal sectional view of the power unit, including the counter shaft 10, the output shaft 11, the shift fork guide shaft 19, the shift drum 20, and the strainer 85.

FIG. 8 is a longitudinal sectional view of the power unit 6, including the counter shaft 10, the output shaft 11, the shift fork guide shaft 19, the shift drum 20, and a strainer 85. In FIG. 8, the arrows indicate a direction of oil flow. An oil pump is provided on the front side of the strainer 85. The oil pump is a tandem oil pump composed of a rear oil pump 88 and a front oil pump 89 mounted on a common oil pump shaft 90. The rear oil pump 88 communicates with an upper space 87 formed above the strainer 85. The strainer 85 and its periphery are shown in front elevation in FIG. 2.

Figure 10:
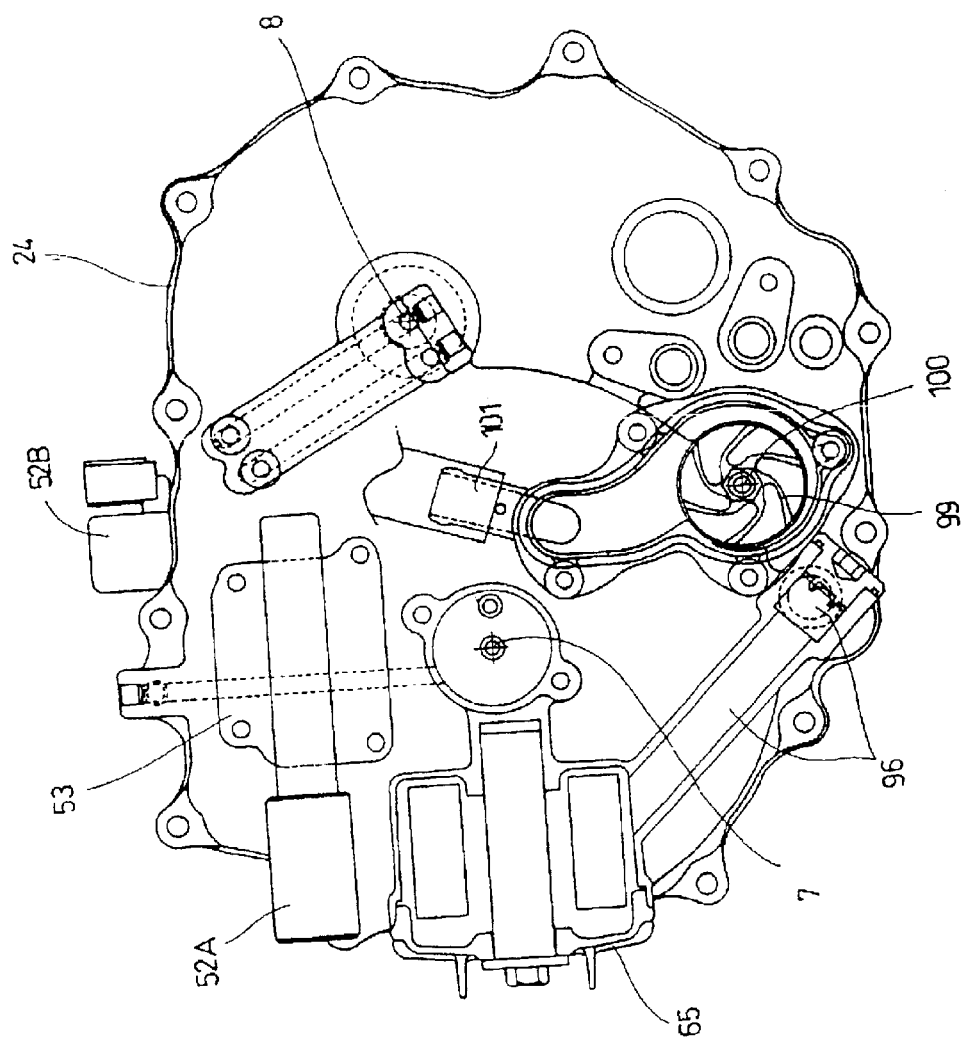
FIG. 10 is a front elevation of the oil filter and its associated parts provided on the front side of the front crankcase cover.

FIG. 9 is a front elevation of the oil pump and its associated parts provided between the front crankcase cover 24 and the front crankcase 25, and FIG. 10 is a front elevation of the oil filter 65 and its associated parts provided on the front side of the front crankcase cover 24. In FIG. 9, the arcuate arrow T indicates a direction of rotation of the pump impeller 31 in the torque converter 30. As shown in FIGS. 6 and 9, the oil pump shaft 90 is driven through a chain 93 wrapped between a sprocket 91 mounted on the crankshaft 7 and a sprocket 92 mounted on the oil pump shaft 90.

The oil dropped into the lower space 62a of the transmission chamber 62 shown in FIGS. 2 and 6 flows into a lower space 86 formed below the strainer 85 shown in FIGS. 2 and 8. The oil is next pumped up by the operation of the oil pump to pass through the strainer 85 into the upper space 87 formed above the strainer 85. The oil is further sucked by the rear oil pump 88 communicating with the upper space 87, and is discharged through a rear pump discharge pipe 94 shown in FIG. 6 to an oil tank (not shown). The oil in the oil tank is sucked through a suction pipe 95 shown in FIG. 8 by the front oil pump 89, and is discharged through a front pump discharge pipe 96 shown in FIG. 6 to the oil filter 65 shown in FIGS. 6 and 10. As shown in FIGS. 6 and 9, the front pump discharge pipe 96 is branched to form a branch pipe 97 connected to a pressure control valve 98 for maintaining the pressure of the oil supplied to the oil filter 65 at a given value.

A part of the oil fed to the oil filter 65 and purified therein is supplied to the double pipe inserted in the crankshaft 7, and serves as the hydraulic oil for the torque converter 30, the lubricating oil for the bearings on the outer circumference of the crankshaft 7, and the lubricating oil for the crankpin 7b. Another part of the oil from the oil filter 65 is fed through oil passages formed in the crankcase covers 24 and 27 and in the crankcases 25 and 26 to the bearings for the rotating shafts in the transmission chamber 62, serving as a lubricating oil. Still another part of the oil from the oil filter 65 is fed through the valve body 53 equipped with a linear solenoid valve 52A and a shift solenoid valve 52B to the first-speed hydraulic multiple disc clutch 39 or the second-speed hydraulic multiple disc clutch 40 for switching between the first speed and the second speed. The solenoid valves 52A and 52B are on/off controlled by the electronic control unit.

As shown in FIG. 6, a water pump 99 is connected to the front end of the oil pump shaft 90. The water pump 99 is mounted on a water pump shaft 100 coaxially rotating with the oil pump shaft 90. Water discharged from the water pump 99 is fed through a discharge port 101 to the surrounding of the cylinder for the purpose of cooling.

As shown in FIG. 7, a longer sleeve 102 is connected at one end thereof to a base portion 33a of the stator 33 in the torque converter 30 so as to be operated with the stator 33. The longer sleeve 102 is rotatably supported through needle bearings 103 to the outer circumference of the crankshaft 7. A large-diameter portion 102a is formed at the other end of the longer sleeve 102. A shorter sleeve 104 is provided inside of the large-diameter portion 102a of the longer sleeve 102 and near the other end of the longer sleeve 102. The shorter sleeve 104 is rotatably supported through a needle bearing 105 to the outer circumference of the crankshaft 7. A one-way clutch 106 is interposed between the large-diameter portion 102a of the longer sleeve 102 and the shorter sleeve 104. A flange portion 104a is formed at one end of the shorter sleeve 104, and an arm 107 projects from the outer circumference of the flange portion 104a. The arm 107 is in abutment at its outer end with one end of the pressure control valve 98.

Figure 11:
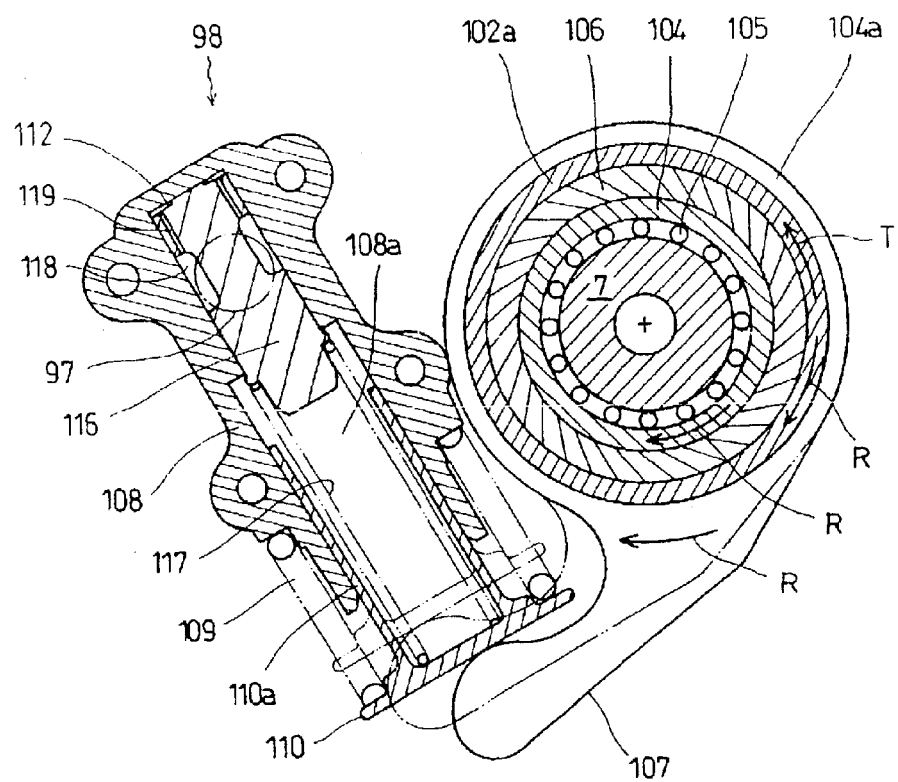
FIG. 11 is a transverse sectional view including the large-diameter portion 102a of the longer sleeve 102, the one-way clutch 106, the shorter sleeve 104, and the pressure control valve 98.
Figure 12:
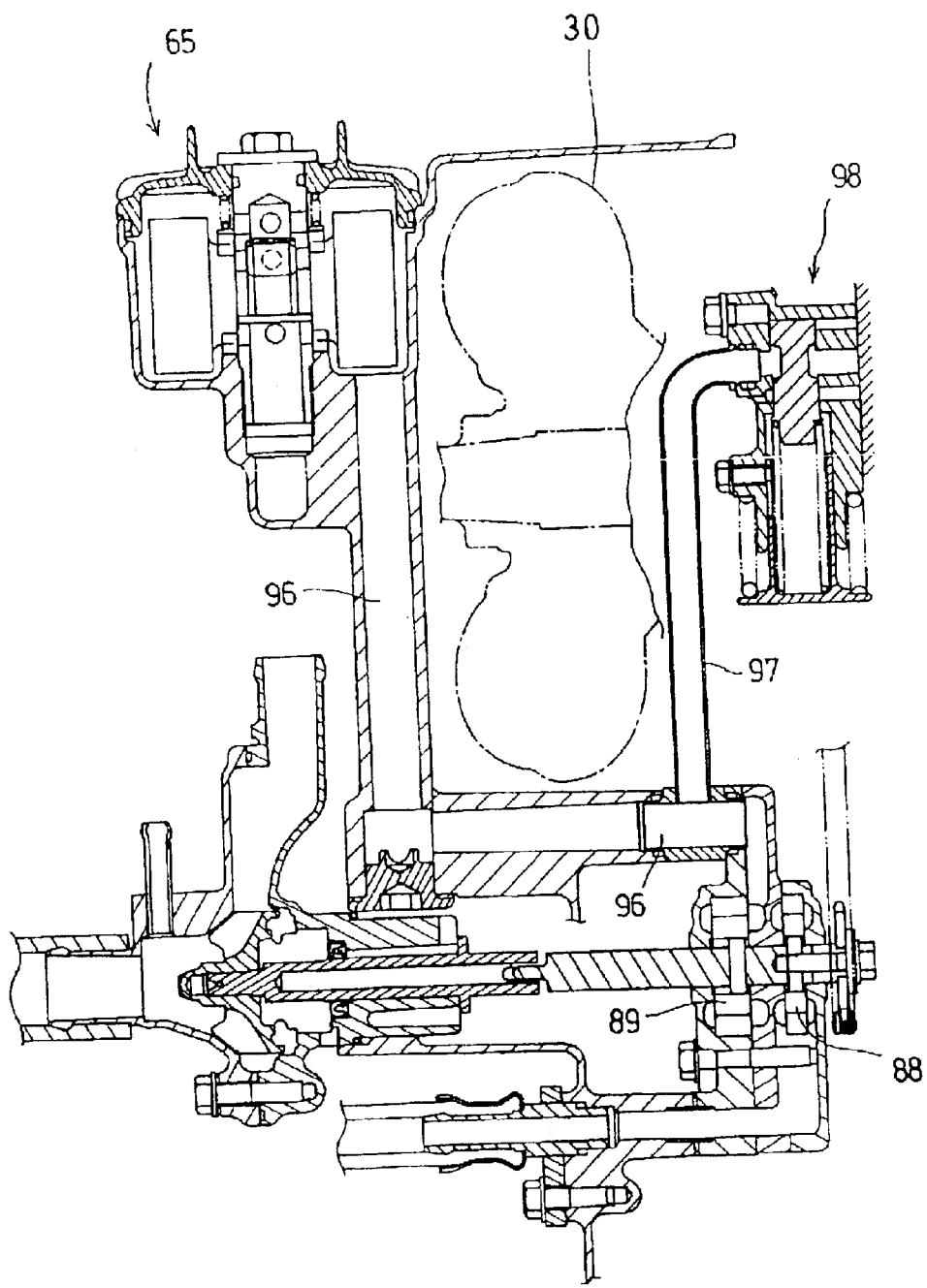
FIG. 12 is a longitudinal sectional view showing the connection of the discharge pipe 96 of the front oil pump 89 communicating with the oil filter 65 and the connection of the branch pipe 97 branched from the discharge pipe 96 to communicate with the pressure control valve 98.

FIG. 11 is a transverse sectional view including the large-diameter portion 102a of the longer sleeve 102, the one-way clutch 106, the shorter sleeve 104, and the pressure control valve 98. The arm 107 is also shown in front elevation. The positions of these parts in the crankcase 23 are shown in FIG. 9. Referring to FIG. 11, the pressure control valve 98 includes a cylinder 108 having a center hole 108a, a movable end plate 110 having a cylindrical portion 110a slidably engaged with the center hole 108a of the cylinder 108. The external coil spring 109 is interposed between the shoulder portion of the cylinder 108 and the flange portion of the movable end plate 110. The branch pipe 97 is connected to the cylinder 108. FIG. 12 is a longitudinal sectional view showing the connection of the discharge pipe 96 of the front oil pump 89 communicating with the oil filter 65 and the connection of the branch pipe 97 branched from the discharge pipe 96 to communicate with the pressure control valve 98.

Figure 13:
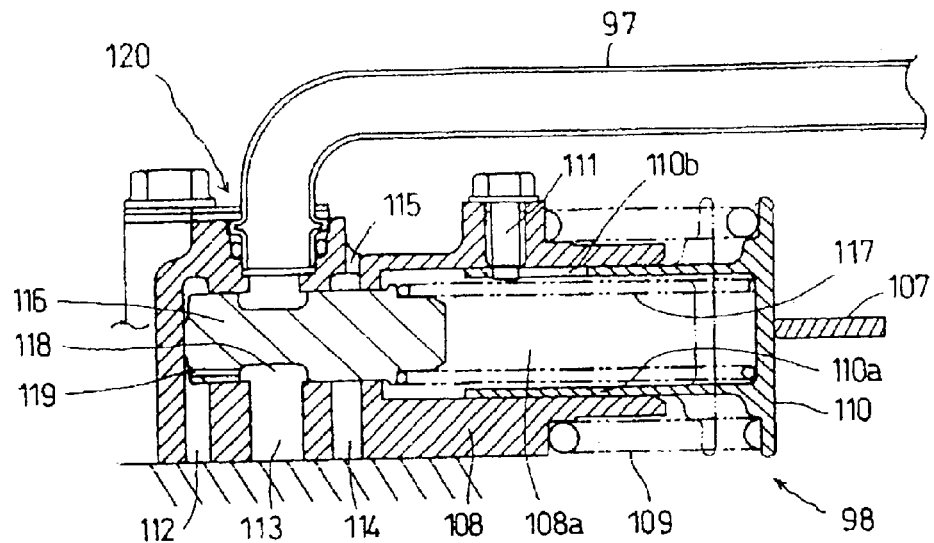
FIG. 13 is a longitudinal sectional view of the pressure control valve in the condition where no hydraulic pressure is applied from the branch pipe and no compressive force is applied from the arm to the internal coil spring.

FIG. 13 is a longitudinal sectional view of the pressure control valve 98. As shown in FIG. 13, the cylindrical portion 110a of the movable end plate 110 is formed with an elongated hole 110b, and a stopper bolt 111 is fitted with the cylinder 108 so that the tip of the stopper bolt 111 is exposed to the elongated hole 110b, thereby restricting the axial movement of the movable end plate 110. The cylinder 108 has a closed end portion opposite to the movable end plate 110. The closed end portion of the cylinder 108 is formed with a back pressure chamber 112, a pressure receiving chamber 113, and a pressure relief chamber 114 each crossing the center hole 108a. These chambers 112, 113, and 114 are formed by boring a mounting sidewall of the cylinder 108. Accordingly, when the cylinder 108 is mounted on a wall surface, these chambers 112, 113, and 114 are closed by this wall surface. The cylinder 108 is further formed with a pressure relief hole 115 communicating with the pressure relief chamber 114 and opening to the outside of the cylinder 108. A spool 116 is axially movably fitted in the center hole 108a of the cylinder 108 at its closed end portion. The outer circumference of the spool 116 at its one end portion is formed with a shoulder portion. An internal coil spring 117, lower in elasticity than the external coil spring 109, is interposed between the shoulder portion of the spool 116 and the movable end plate 110. The outer circumference of the spool 116 is further formed with an annular groove 118 exposed to the pressure receiving chamber 113 when the spool 116 is biased by the internal coil spring 117 to abut against the closed end of the center hole 108a of the cylinder 108. The spool 116 is formed with a communication hole 119 for making communication of the annular groove 118 and the back pressure chamber 112. The cylinder 108 is formed with a branch pipe connecting portion 120 communicating with the pressure receiving chamber 113. The branch pipe 97, branched from the discharge pipe 96 of the front oil pump 89, is connected to the branch pipe connecting portion 120 of the cylinder 108.

The pressure control valve 98 having the above configuration functions to maintain the hydraulic pressure upstream of the pressure control valve 98 at a variable pressure value automatically set according to the position of the movable end plate 110 pushed by the arm 107. In a general pressure control valve, an end plate corresponding to the movable end plate 110 is fixed during the operation and the hydraulic pressure upstream of the pressure control valve is maintained at a predetermined constant pressure.

Prior to describing the operation of the pressure control valve 98 according to this preferred embodiment, there will now be described a case where the movable end plate 110 is fixed at the position shown in FIG. 13. As shown in FIG. 6, the pump shaft 90 of the oil pumps 88 and 89 is driven through the sprocket 91 mounted on the crankshaft 7, the sprocket 92 mounted on the oil pump 90, and the chain 93 wrapped between these sprockets 91 and 92. As shown in FIG. 12, the oil is supplied from the discharge pipe 96 of the front oil pump 89 to the oil filter 65. A part of the oil from the oil filter 65 is supplied through the oil passage defined between the outer pipe 36 and the inner pipe 37 shown in FIG. 3 to the torque converter 30. Another part of the oil from the oil filter 65 is supplied through the valve body 53, the oil passages 54 and 55, and the oil passage defined between the outer pipe 50 and the inner pipe 51 shown in FIG. 3 to the hydraulic clutches 39 and 40. The residual oil is supplied to necessary parts to be lubricated.

At the same time, the oil supplied through the discharge pipe 96 is also supplied through the branch pipe 97 branched from the discharge pipe 96 to the pressure control valve 98.

Figure 14:
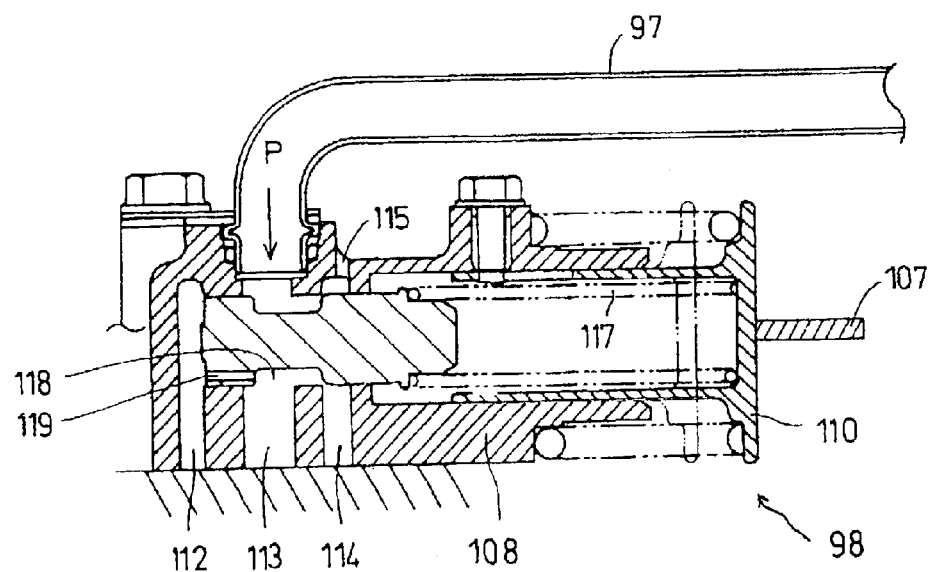
FIG. 14 is a longitudinal sectional view of the pressure control valve in the condition where a critical pressure is applied from the branch pipe, but no compressive force is applied from the arm to the internal coil spring.

Then, the hydraulic pressure in the discharge pipe 96 is applied to the pressure receiving chamber 113 of the pressure control valve 98 shown in FIG. 13. When the hydraulic pressure in the discharge pipe 96 is low, the spool 116 remains still. When the hydraulic pressure in the discharge pipe 96 is increased, the spool 116 is moved to the right in the cylinder 108 as viewed in FIG. 13 against the biasing force of the internal coil spring 117 by the increased hydraulic pressure applied through the branch pipe 97, the pressure receiving chamber 113, the annular groove 118, and the communication hole 119 to the back pressure chamber 112. When the hydraulic pressure in the discharge pipe 96 becomes higher than a certain value, the spool 116 reaches a maximum moving position shown in FIG. 14. In FIG. 14, the arrow P denotes the application of the hydraulic pressure to the spool 116. At this maximum moving position of the spool 116, the annular groove 118 communicates with the pressure relief chamber 114, so that the hydraulic pressure in the discharge pipe 96 is relieved through the branch pipe 97, the pressure receiving chamber 113, the annular groove 118, the pressure relief chamber 114, and the pressure relief hole 115 into the transmission chamber 62. The hydraulic pressure in the pressure receiving chamber 113 at this time is a critical pressure in the pressure control valve 98, and the hydraulic pressure in the discharge pipe 96 upstream of the pressure control valve 98 is therefore maintained at this critical pressure. In general, a discharge pressure from an oil pump is preliminarily set higher than the above critical pressure, and an excess hydraulic pressure is relieved through a pressure control valve to thereby maintain the hydraulic pressure upstream of the pressure control valve at a given value. Also in this preferred embodiment, the discharge pressure from the oil pump 89 is preliminarily set higher than the critical pressure. The critical pressure is determined by the compressed condition of the internal coil spring 117 at the maximum moving position of the spool 116. In the case where internal coil spring 117 is preliminarily compressed, the critical pressure is increased.

In a transmission having a hydraulic clutch adapted to be engaged and disengaged for the switching of speed-change gears, a power transmitting force is increased by increasing a contact pressure applied to a clutch plate. Although the contact pressure can be increased by increasing a clutch capacity, the clutch is undesirably increased in size. Increasing the contact pressure is required at the time the vehicle is accelerated to operate the clutch. In a vehicle including a torque converter, a large contact pressure is required when a torque amplification rate becomes high during acceleration of the vehicle. In the torque converter during acceleration of the vehicle, there sometimes arises a condition that the rotation of a pump impeller is not sufficiently followed by the rotation of a turbine runner. At this time, a repulsive force is applied to a stator, causing the rotation of the stator in a direction opposite to the rotational direction of the pump impeller. In this preferred embodiment, such a repulsive force applied to the stator at acceleration of the vehicle is utilized to increase the hydraulic pressure applied to the hydraulic system at acceleration of the vehicle.

As shown in FIG. 9, the rotational direction of the pump impeller 31 is denoted by the arrow T. At acceleration of the vehicle, a repulsive force having a direction denoted by the arrow R opposite to the direction T is applied to the stator 33. The rotation of the stator 33 in the direction R is transmitted through the base portion 33a of the stator 33 to the longer sleeve 102 shown in FIG. 7, causing the rotation of the large-diameter portion 102a of the longer sleeve 102 in the direction R. The rotation of the large-diameter portion 102a in the direction R is further transmitted through the one-way clutch 106 to the shorter sleeve 104, the flange portion 104a of the shorter sleeve 104, and the arm 107, thereby rotating the arm 107 in the direction R as shown in FIG. 11. The one-way clutch 106 functions to transmit the rotation of the large-diameter portion 102a in the direction R, i.e., the rotation of the stator 33 in the direction of the repulsive force, to the shorter sleeve 104, but not to transmit the rotation opposite in direction to the direction R. The outer end of the arm 107 is in abutment against the movable end plate 110 of the pressure control valve 98, and when the arm 107 is rotated in the direction R, the movable end plate 110 is pushed by the arm 107 against the biasing forces of the coil springs 109 and 117. When the repulsive force applied to the stator 33 is large, the movable end plate 110 is moved to a maximum moving position inside the center hole 108a of the cylinder 108, i.e., to a position shown by a chain double-dashed line in FIG. 11. This position is determined by the abutment of the stopper bolt 111 against one end of the elongated hole 110b formed through the cylindrical portion 110a of the movable end plate 110.

Figure 15:
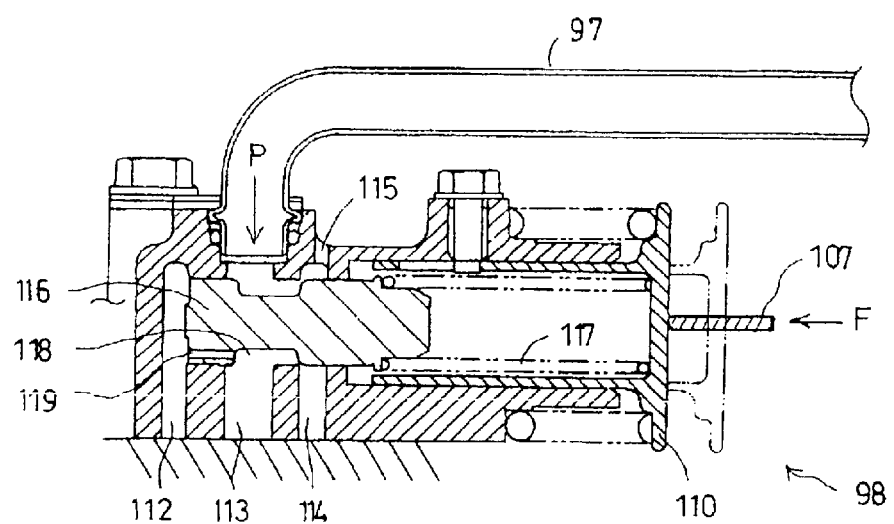
FIG. 15 is a longitudinal sectional view of the pressure control valve in the condition where a critical pressure is applied from the branch pipe, and a maximum compressive force is applied from the arm to the internal coil spring.

As mentioned above, the critical pressure upstream of the pressure control valve 98, i.e., in the discharge pipe 96 of the oil pump 89 is determined by the compressed condition of the internal coil spring 117 at the maximum moving position of the spool 116. In the case where a mechanical compressive force is applied to the coil spring 117 from the opposite side of the hydraulic pressure to the spool 116, the above critical pressure is increased. At acceleration of the vehicle where the critical pressure is applied to the pressure control valve 89 and a maximum mechanical compressive force is applied from the arm 107, the positions of the spool 116 and the movable end plate 110 are shown in FIG. 15. In FIG. 15, the arrow F indicates that the maximum mechanical compressive force is applied from the arm 107 to the movable end plate 110. As is apparent from FIG. 15, the internal coil spring 117 in the condition where the mechanical compressive force is applied is shorter in length than that in the condition where no mechanical compressive force is applied as shown in FIG. 14. Accordingly, the critical pressure in the pressure control valve 98 in the condition shown in FIG. 15 is higher than that in the condition shown in FIG. 14, and the critical pressure in the discharge pipe 96 of the oil pump 89 in the condition shown in FIG. 15 is also maintained higher than that in the condition shown in FIG. 14. As a result, at the time of operating the hydraulic clutch, i.e., during acceleration of the vehicle, a higher hydraulic pressure can be supplied to the hydraulic clutch, thereby increasing the power transmitting rate of the clutch.

When the rotation of the turbine runner 32 in the torque converter 30 starts to follow the rotation of the pump impeller 31 in the accelerating condition of the vehicle, the acceleration of the vehicle is ended. Accordingly, the repulsive force applied to the stator 33 is reduced and the stator 33 finally starts to rotate in the direction T shown in FIG. 9 as following the rotation of the pump impeller 31. This rotation of the stator 33 in the direction T is also transmitted through the base portion 33a of the stator 33, the longer sleeve 102, and to the large-diameter portion 102a of the longer sleeve 102. However, the one-way clutch 106 does not transmit the rotation of the large-diameter portion 102a in the direction T to the shorter sleeve 104. Accordingly, the arm 107 is in a free condition where no torque is received, so that the arm 107 is biased by the coil springs 109 and 117, and the movable end plate 110 is returned to the outermost position shown in FIG. 14. As a result, the critical pressure in the pressure control valve 98 is also returned to a normal pressure in the steady driving condition of the vehicle, and the pressure in the discharge pipe 96 is also returned to the normal pressure.

As described above, a large hydraulic pressure is supplied to the hydraulic clutch at acceleration of the vehicle by the switching of speed-change gears, so that a large power can be transmitted with a compact clutch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic transmission in a power unit with a torque converter and a hydraulic clutch adapted to be engaged and disengaged in switching of speed-change gears, said automatic transmission comprising:
   a pressure control valve provided at a discharge port of an oil pump for supplying hydraulic oil to said hydraulic clutch;
   said pressure control valve comprising:
      a valve body;
      a valve element axially slidably provided in said valve body; and
      a spring provided between said valve element and said valve body in a sliding direction of said valve element for adjusting a set pressure for opening/closing of said pressure control valve;
   said valve element being urged in its closing direction by a repulsive force applied to a stator in said torque converter;
   said valve element includes an aperture for selectively being in communication with a pressure relief chamber.

2. The automatic transmission in a power unit with a torque converter and a hydraulic clutch according to claim 1, and further including a movable end plate operatively mounted relative to said valve body for providing a point of contact for one end of said spring.

3. The automatic transmission in a power unit with a torque converter and a hydraulic clutch according to claim 2, and further including an external spring provided between the valve body and the movable end plate for biasing said movable end plate in a predetermined direction.

4. The automatic transmission in a power unit with a torque converter and a hydraulic clutch according to claim 2, and further including a stopper mounted on said valve body for selectively engaging said movable end plate for limiting the movement thereof.

5. The automatic transmission in a power unit with a torque converter and a hydraulic clutch according to claim 1, wherein said valve element includes an aperture for selectively being in communication with a back pressure chamber.

6. The automatic transmission in a power unit with a torque converter and a hydraulic clutch according to claim 1, wherein said valve element includes an aperture for selectively being in communication with a pressure receiving chamber.

7. The automatic transmission in a power unit with a torque converter and a hydraulic clutch according to claim 6, wherein during normal operation hydraulic pressure is supplied to the valve body and is discharged to the pressure receiving chamber.

8. The automatic transmission in a power unit with a torque converter and a hydraulic clutch according to claim 1, wherein during an increase in hydraulic pressure, said valve element is imparted with movement and hydraulic pressure supplied to the valve body is brought into communication with the pressure relief chamber.

9. The pressure control valve according to claim 1, wherein during an increase in hydraulic pressure, said valve element is imparted with movement and hydraulic pressure supplied to the valve body is brought into communication with the pressure relief chamber.

10. A pressure control valve adapted to be used with an automatic transmission in a power unit with a torque converter and a hydraulic clutch for engaging and disengaging during a switching of speed-change gears, comprising:

said pressure control valve being provided at a discharge port of an oil pump for supplying hydraulic oil to said hydraulic clutch; said pressure control valve comprising:
a valve body;
a valve element axially slidably provided in said valve body; and
a spring provided between said valve element and said valve body in a sliding direction of said valve element for adjusting a set pressure for opening/ closing of said pressure control valve;
said valve element being urged in its closing direction by a repulsive force applied to a stator in said torque converter;
said valve element includes an aperture for selectively being in communication with a pressure relief chamber.

11. The pressure control valve according to claim 10, and further including a movable end plate operatively mounted relative to said valve body for providing a point of contact for one end of said spring.

12. The pressure control valve according to claim 11, and further including an external spring provided between the valve body and the movable end plate for biasing said movable end plate in a predetermined direction.

13. The pressure control valve according to claim 11, and further including a stopper mounted on said valve body for selectively engaging said movable end plate for limiting the movement thereof.

14. The pressure control valve according to claim 10, wherein said valve element includes an aperture for selectively being in communication with a back pressure chamber.

15. The pressure control valve according to claim 10, wherein said valve element includes an aperture for selectively being in communication with a pressure receiving chamber.

16. The pressure control valve according to claim 15, wherein during normal operation hydraulic pressure is supplied to the valve body and is discharged to the pressure receiving chamber.

* * * * *